(12) United States Patent
Herley

(10) Patent No.: US 7,343,418 B2
(45) Date of Patent: Mar. 11, 2008

(54) PEER TO PEER NETWORK

(75) Inventor: Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1264 days.

(21) Appl. No.: 10/161,428

(22) Filed: Jun. 3, 2002

(65) Prior Publication Data
US 2003/0236894 A1 Dec. 25, 2003

(51) Int. Cl.
*G06F 15/16* (2006.01)
(52) U.S. Cl. .................... 709/229; 709/223
(58) Field of Classification Search ........... 707/2–6, 707/10; 709/228–229, 227, 223
See application file for complete search history.

(56) References Cited

U.S. PATENT DOCUMENTS

| 4,489,379 | A | | 12/1984 | Lanier | |
|---|---|---|---|---|---|
| 4,642,758 | A | * | 2/1987 | Teng | 707/10 |
| 6,041,343 | A | | 3/2000 | Nguyen | |
| 6,219,669 | B1 | * | 4/2001 | Haff et al. | 707/10 |
| 6,850,965 | B2 | * | 2/2005 | Allen | 709/203 |
| 2002/0073204 | A1 | * | 6/2002 | Dutta et al. | 709/227 |
| 2002/0165979 | A1 | * | 11/2002 | Vincent | 709/239 |
| 2002/0184357 | A1 | * | 12/2002 | Traversat et al. | 709/223 |
| 2003/0053475 | A1 | * | 3/2003 | Veeraraghavan et al. | 370/431 |
| 2003/0065774 | A1 | * | 4/2003 | Steiner et al. | 709/225 |

FOREIGN PATENT DOCUMENTS

GB 371610 * 10/1989

OTHER PUBLICATIONS

Ian Clarke, et al.; "Freenet: A Distributed Anonymous Information Storage and Retrieval System"; 2000, pp. 1-21.
Brian F. Cooper, et al., "Peer-to-Peer Data Trading to Preserve Information"; ACM Transactions on Information Systems, vol. 20, No. 2, Apr. 2002, pp. 113-170.

* cited by examiner

*Primary Examiner*—William Vaughn, Jr.
*Assistant Examiner*—Greg Bengzon
(74) *Attorney, Agent, or Firm*—Amin, Turocy & Calvin, LLP

(57) ABSTRACT

A system and method for data distribution is disclosed. A bulletin board is employed to maintain a list of requests from nodes in the system. The requests indicate data requested and identify the node making the request. Nodes are able to post requests for data as long as they maintain a minimum performance level. Additionally, the nodes periodically check in with the bulletin board and receive the list of requests from the bulletin board. On determining to satisfy a particular request by a node, the node (serving node) contacts a requesting node (identified in the request) and transfers the requested data to the requesting node. After successful completion of the transfer, the requesting node reports to the bulletin board that the node has filled the request and the request is removed from the list of requests.

33 Claims, 10 Drawing Sheets

PEER TO PEER NETWORK

TECHNICAL FIELD

The present invention relates generally to distributing data, and more particularly to systems and methods for distributing data in a peer to peer network.

BACKGROUND OF THE INVENTION

A peer to peer network is a network of two or more computers that employ a same program or type of program to communicate and share data. Each computer or peer (e.g., node) is typically considered equal in terms of responsibilities and acts as a server to others in a network. A peer to peer network is unlike a client/server architecture where a dedicated file server is required. Peer to peer networks have become increasingly popular —users employ peer to peer networks for sharing of data, such as audio files, multimedia files, video files, programs, digital images and the like.

One common implementation of a peer to peer network utilizes a central server to maintain a list of nodes and data stored on the nodes, which is an implementation utilized by file sharing software such as Napster. FIG. 1 is a block diagram illustrating a system 100 of such type of peer to peer network implementation. The system 100 includes a central server 102 and a plurality of nodes 104. Respective nodes of the plurality of nodes 104 can join and un-join the system 100 at will. Upon joining, the nodes 104 provide a list of files they are capable of serving to the central server 102. The central server 102 adds the list of files to a list of the available files of all nodes. Upon un-joining by the nodes 104, the list of files are removed from the list of available files for all the nodes. A requesting node 106 (e.g., user) of the nodes 104 requests a file by sending a request for the file to the central server 102. The central server maintains the list of available files of all nodes in the system 100 and responds to the request with a list of nodes capable of answering or satisfying the request. The requesting node 106 then obtains the file via a direct connection to one of the nodes able to satisfy the request (hereinafter referred to as a transferring node 108). The central server 102 is not involved in the transfer of the file to the requesting node 106 (hence the name peer to peer).

Although the conventional system 100 of FIG. 1 performs adequately, there are a number of potential problems associated with such system. One problem is that the system 100 has a single point of failure—even though the central server 102 is not involved in serving requests (e.g., transferring files), the central server 102 is involved in matching every request. Thus, if the central server 102 goes off-line, the entire network can cease to function. A second problem is lack of scalability; the central server 102 is required to track files available at all nodes 104; and since nodes can appear and disappear, the central server 102 must periodically contact each of the respective nodes 104 (e.g., by pinging the nodes). Such repeated updating can be a significant burden on the central server 102 and the burden increases coincidently with an increase in number of nodes in the system 100.

Another problem is a lack of anonymity. Since nodes serve and receive files from each other, sending or transferring nodes are required to identify themselves to each other (e.g., by exposing their IP addresses) along with data the nodes are willing to serve. Furthermore, lack of fairness can be yet another obstacle associated with such conventional system. It is possible for one of the nodes 104 to request and receive many files and refuse to serve any, thereby partaking in the benefits of the network without shouldering any of the burden. Additionally, since the central server 102 does not track transferring of files, nodes can deliberately misrepresent themselves.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention relates generally to systems and methods for data distribution, and more specifically to systems and methods that facilitate data distribution in peer to peer networks. The present invention provides a data distribution system that is highly scalable, evenly distributes workload, enforces fairness and facilitates preserving anonymity of nodes or peers. A bulletin board is employed to maintain a list of requests from various nodes or peers in the system and, unlike conventional peer to peer networks, does not require a central server to track available files or data available and which nodes have which data. The requests are in a predefined machine readable format and indicate data requested and identify node(s) making the request. Nodes are able to post requests for data as long as they maintain a minimum performance level (e.g., serve a sufficient number of files and/or satisfy a sufficient number of requests). Additionally, the nodes periodically register with the bulletin board according to an assigned check in frequency and receive the list of requests from the bulletin board. The nodes are operative to scan the list and determine which, if any, requests the node is willing to fill. On determining to satisfy a particular request by a node, the node contacts a requesting node (identified in the request) and offers to transfer the requested data. If the requesting node accepts the offer, the node transfers the requested data to the requesting node. After successful completion of the transfer, the requesting node reports to the bulletin board that the node has filled the request.

The present invention is highly scalable in part because nodes can join or un-join the system without the bulletin board or other component being required to track the respective nodes. Additionally, relatively large or small numbers of nodes can be present in the system because the bulletin board has limited responsibilities as compared with conventional peer to peer networks. For example, the bulletin board can simply reduce check in frequencies for the nodes in order to accommodate more nodes in the system. Anonymity is facilitated by the invention because the bulletin board does not maintain a list of available files, but rather maintains a list of requests for data. Additionally, the invention can provide for only a node agreeing to satisfy a request being able to view a requesting nodes address or identification (e.g., pointer) and a serving node (a node agreeing to satisfy a request) is only viewed by the requesting node. The present invention can enforce fairness by tracking performance statistics for the node (e.g., requests made, requests filled, proper check ins and the like) and mitigating requests from nodes that fail to properly contribute to the distribution system.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
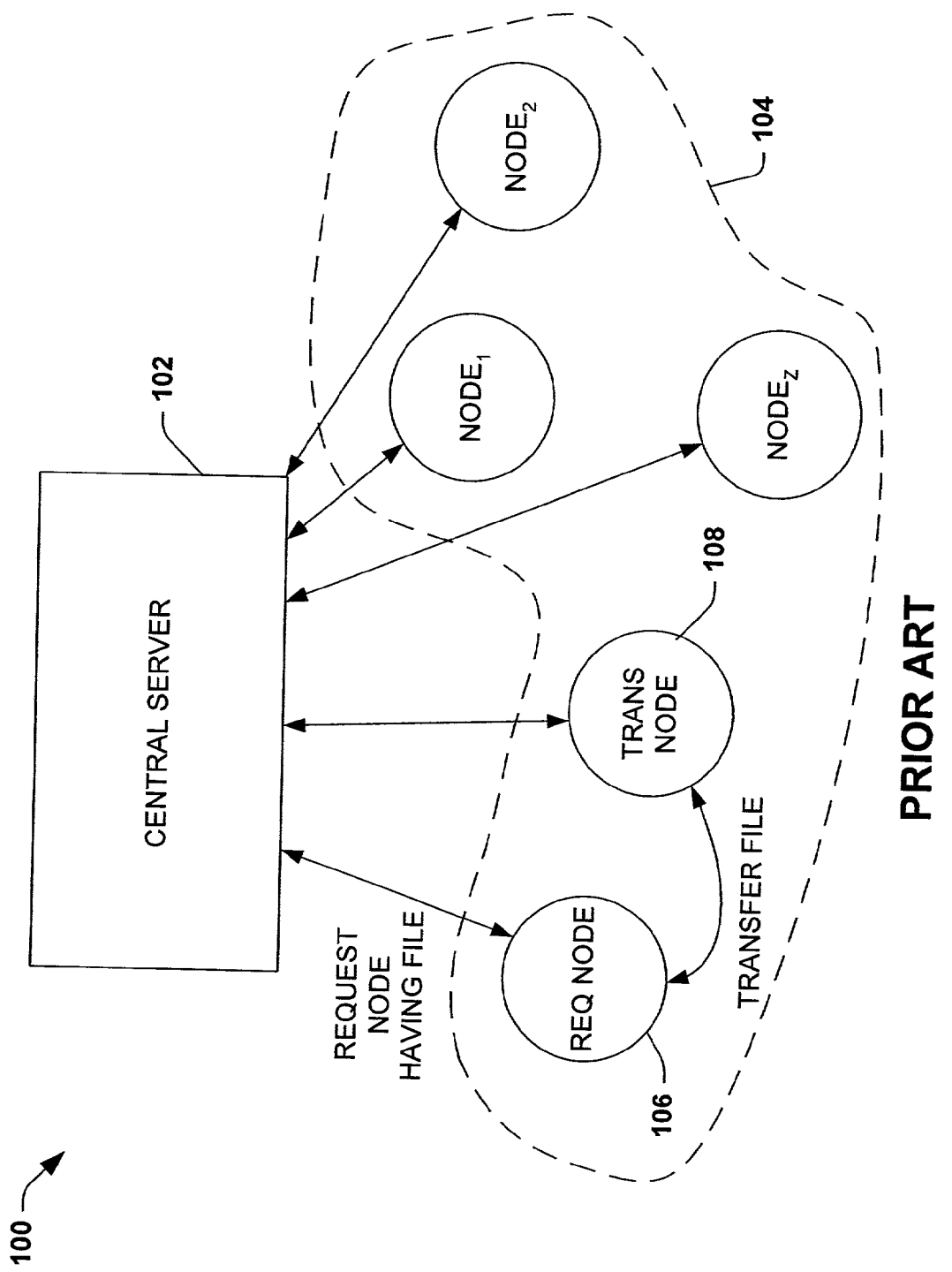
FIG. 1 is a block diagram illustrating a conventional peer to peer network.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

It is to be appreciated that, for purposes of the present invention, any or all of the functionality associated with modules, systems and/or components discussed herein can be achieved in any of a variety of ways (e.g. combination or individual implementations of active server pages (ASPs), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (OR-DBMS), remote method invocation (RMI), C, C++, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

Figure 2:
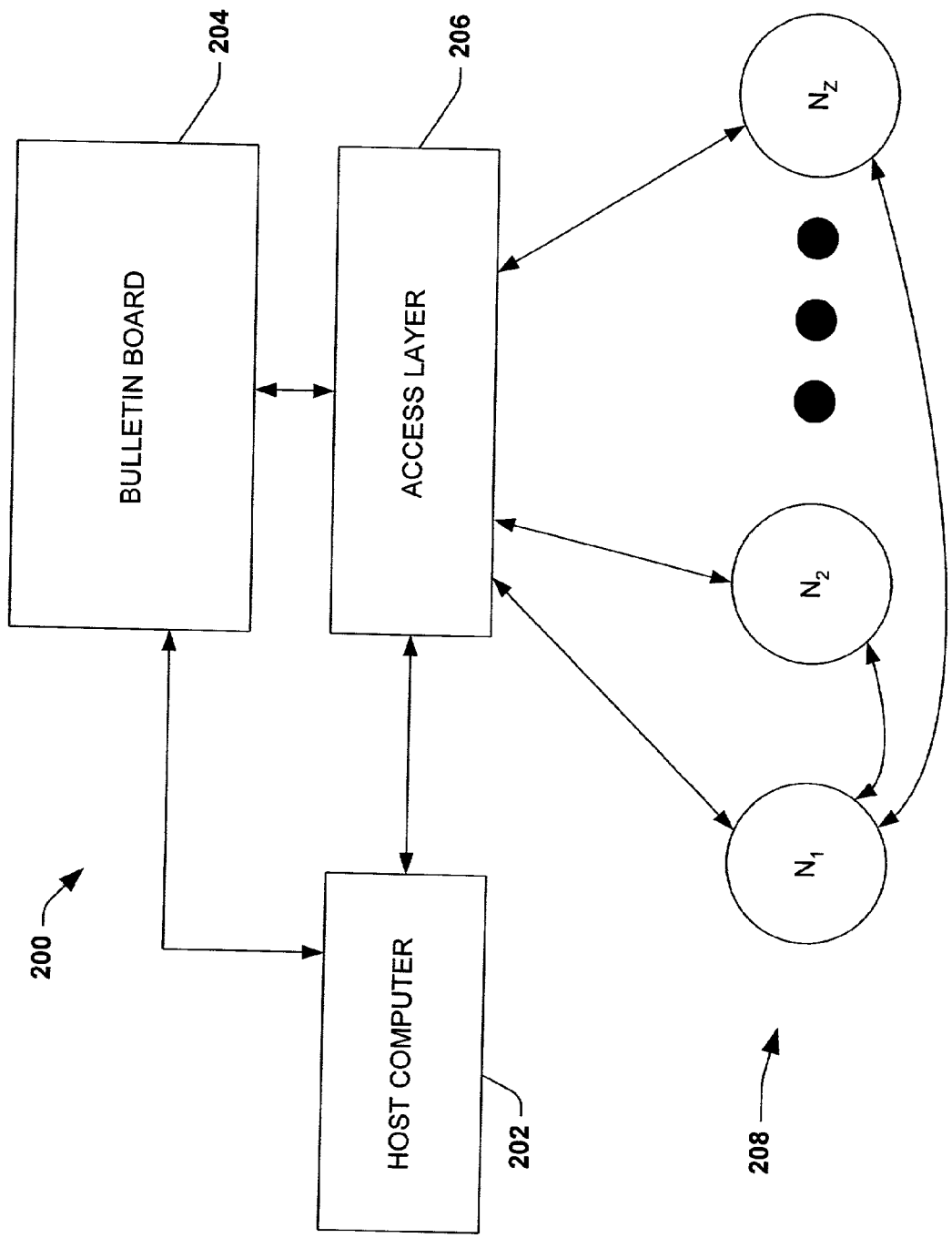
FIG. 2 is a block diagram illustrating a data distribution system according to an aspect of the present invention.

FIG. 2 is a block diagram illustrating a data distribution system 200 according to an aspect of the present invention. The data distribution system 200 includes a host computer 202, a bulletin board 204, an access layer 206 and a plurality of nodes 208. The data distribution system is a peer to peer network and thus, permits data content to be requested and transferred to and from the plurality of nodes 208. Unlike other conventional peer to peer networks, the system 200 does not centrally maintain a list of available files and nodes storing those files, but instead employs the bulletin board 204 to maintain a list of requests or requested files. Furthermore, the system 200 is not required to track when the nodes enter and leave (e.g, join and un-join) the system 200. Additionally, the system 200 employs the access layer 206 to track and enforce fairness such that the nodes 208 properly contribute to the system 200 (e.g., sending files) in order to benefit from the system (e.g., receiving files).

The plurality of nodes 208 are operative to make requests for data, fill or serve requests for data and register periodically at a check in frequency. The plurality of nodes 208 are typically software components operating or executing on a computer system. The nodes 208 are able to communicate and transfer data with each other, the bulletin board 204 and the access layer 206, generally via a network connection (e.g., Internet, wireless network, local area network, wide area network and the like) employing established protocols.

The host computer 202 controls and operates the bulletin board 204 and the access layer 206. The host computer 202 can be accessed by a user or operator in order to modify control and operation of the bulletin board 204 and the access layer. The user or operator can access the host computer by an input device (e.g., keyboard) of the host computer or remotely via a network connection.

The bulletin board 204, as stated above, maintains a list of requests that are in a predefined machine readable format. The requests in the list respectively include requested data (e.g., a file, an item or portion of a file) and a pointer to a requesting node (e.g., the node requesting the data). The pointer can simply be a network address, such as an IP address and port number, of the requesting node or other indicator such that the requesting node is identifiable and contactable by other nodes of the plurality of nodes 208. Additionally, the requests can include other information, such as, priority, desired time out period, download bandwidth and the like. The priority, also referred to as weighting, can be specified to indicate that some requests are more important than other requests. The download bandwidth refers to the capability of the requesting node to receive the requested data. It is appreciated that the nodes 208 should be prevented from setting a large number or all requests to a highest priority in order to preserve usefulness of having priorities. As an example, nodes can be allotted a fixed number of high priority requests for serving or transferring requested data.

It is likely or possible that some requests can remain unfulfilled even after relatively lengthy periods of time. A requesting node can, for example, have incorrectly identified (e.g., misspelled) the requested data. System resources can be wasted by the nodes 208 having to be transferred requests even though it is likely that none are able to fill the request. Thus, the bulletin board 204 can remove un-filled requests after a time out period (e.g., after an age of the request exceeds the time out period). The time out period is typically selected so as to remove un-filled requests that have a low likelihood of being filled or served.

Additionally, the bulletin board 204 can compute statistics or weightings regarding popularity of data or files and can assign such weightings to the requests in the list of requests. For example, a particular file (from a request) can be highly requested indicating that the file has high demand but is of low supply. Thus, a node satisfying a request for the particular file can receive a greater amount of serving credits for filling a request for a highly requested file as compared to satisfying a request for a file having low demand. Overall, the system 200 can benefit from such weighting because the weightings provide for the system to operate in accordance with market forces, and better map to supply/demand scenarios with respect to various files. Thus, as highly demanded and weighted requests are filled, the number of nodes capable of filling these requests also increases.

Periodically, the plurality of nodes 208 respectively report in or check in with the bulletin board 204 and obtain a current list of requests employing an established protocol. The frequency with which nodes check in with the bulletin board 204 is referred to as the check in frequency. The check in frequency for respective nodes is generally assigned by the access layer 206 according to a number of factors such as, for example, the number of nodes in the system 200, types of data requested, a ratio of requests filled and made and the like. Thus, the greater the number of nodes in the system, the lower the check in frequency is for respective nodes of the plurality of nodes. Additionally, nodes that satisfy a large number of requests relatively can be rewarded by assignment of a lower check in frequency.

If a node of the plurality of nodes 208 agrees to satisfy a request of the list of requests, the node can be referred to as a serving node. Generally, the nodes 208 should serve data and fill requests in a first in first out (FIFO) order. However, the nodes 208 can employ other information in the request, such as bandwidth or priority, in determining which, if any requests, to fill. For example, the serving node can select a request wherein the requesting node has a bandwidth close to or greater than a bandwidth of the serving node. Upon the serving node committing to fulfill the request, the request is then flagged or otherwise marked to indicate that the request is in the process of being satisfied thereby mitigating another node from attempting to serve the request. The serving node contacts the requesting node via an established protocol to offer the requested data to the requesting node. If the requesting node accepts the offer, the serving node then initiates a transfer of the requested data from the serving node to the requesting node employing an established protocol. The serving node can report errors encountered in transferring the requested data. For example, it is possible that the requesting node is no longer present in the system, thus, the serving node can report to the bulletin board 204 that the requesting node is no longer present in the system (e.g., a failed transfer). Additionally, the serving node can report a successful transfer of the requested data to the bulletin board 204. However, the bulletin board 204 does not remove the request from the maintained list of requests based solely on the serving node reporting a successful transfer of the requested data. Yet, the bulletin board 204 is operative to determine that errors related to a request have exceeded a predetermined threshold and then remove the request from the maintained list of requests. Additionally, the bulletin board 204 can attempt to contact nodes suspected of no longer being present (e.g., by pinging) in order to determine if a particular node is operating. Even if the serving node is unable to fulfill the request (e.g., transfer the requested data), it is appreciated that the serving node can be rewarded by, for example receiving a relatively small number of serving credits for attempting to serve the request.

If the serving node is able to successfully transfer the requested data to the requesting node, the requesting node notifies the bulletin board 204 that the request has been filled by the identified serving node via an established protocol. The bulletin board 204 then removes the satisfied request from the list of requests and the identified serving node is rewarded, by for example receiving serving credit for filling the request and/or reducing its check in frequency.

The access layer 206 is a mechanism for the host computer 202 to regulate access to and/or ability of the nodes 208 to make additional requests based on behavior or performance (e.g., served data). The access layer 206 tracks performance or behavior of the nodes 208 by tracking requests made, requests filled, checking in and the like of the nodes 208. The access layer 206 can prevent nodes from making requests for data if the nodes fail to meet a performance or behavior threshold. One approach for the access layer 206 to track performance is to compute a performance ratio of requests satisfied versus requests made over time. The access layer 206 can then prevent or mitigate nodes from making requests if the performance ratio is below a threshold value (e.g., 25%). Another approach is to provide respective nodes with an initial number of serving credits (e.g., 100) and then add credits for requests filled (e.g., 100) and remove credits for requests made (e.g, 10). Then, a node can only make a request if the node has a suitable number of credits available. Additionally, another approach is to determine if the nodes 208 are regularly checking in by, for example, computing a percentage or ratio based on the number of times checked in versus a number of times a node should have checked in. In yet another approach, the nodes 208 receive credits for properly checking in and lose credits for failing to check in.

The access layer 206 can also determine whether nodes of the plurality of nodes 208 are "alive" or in the system by monitoring check in(s), requests filled and requests made. It is appreciated that inactive nodes are unable to check in, make requests and/or fill requests. Thus, inactive nodes can be detected by failing to check in, fill a request and/or make a request within a selected time out value. Nodes that are determined to be inactive can be effectively removed from the system by no longer tracking performance of the respective nodes. However, the performance information can be retained and reused on the nodes eventually rejoining the system.

Furthermore, as indicated above and further elaborated here, the nodes 208 are operative to make requests and serve requests for portions of files. For especially large files (e.g., a CDROM image), it can be time consuming to transfer such large amounts of data to and from a single pair of nodes. Thus, by permitting requests for portions of files, portions of a large file can be requested and served independently by any suitable number or subset of the nodes 208 (e.g., the portions being 10 MB partitions of the CDROM image). Likewise, it is further appreciated that interruptions of data transfer can occur between the nodes 208 but that interrupted data transfers can be resumed from about the point of interruption. For example, suppose a transfer between a serving node and a requesting node is about halfway complete. Unfortunately, an interruption occurs (e.g., network congestion) causing the data transfer to be interrupted. Fortunately, the system 200 permits the serving node and the requesting node to resume the data transfer at a later time.

Figure 3:
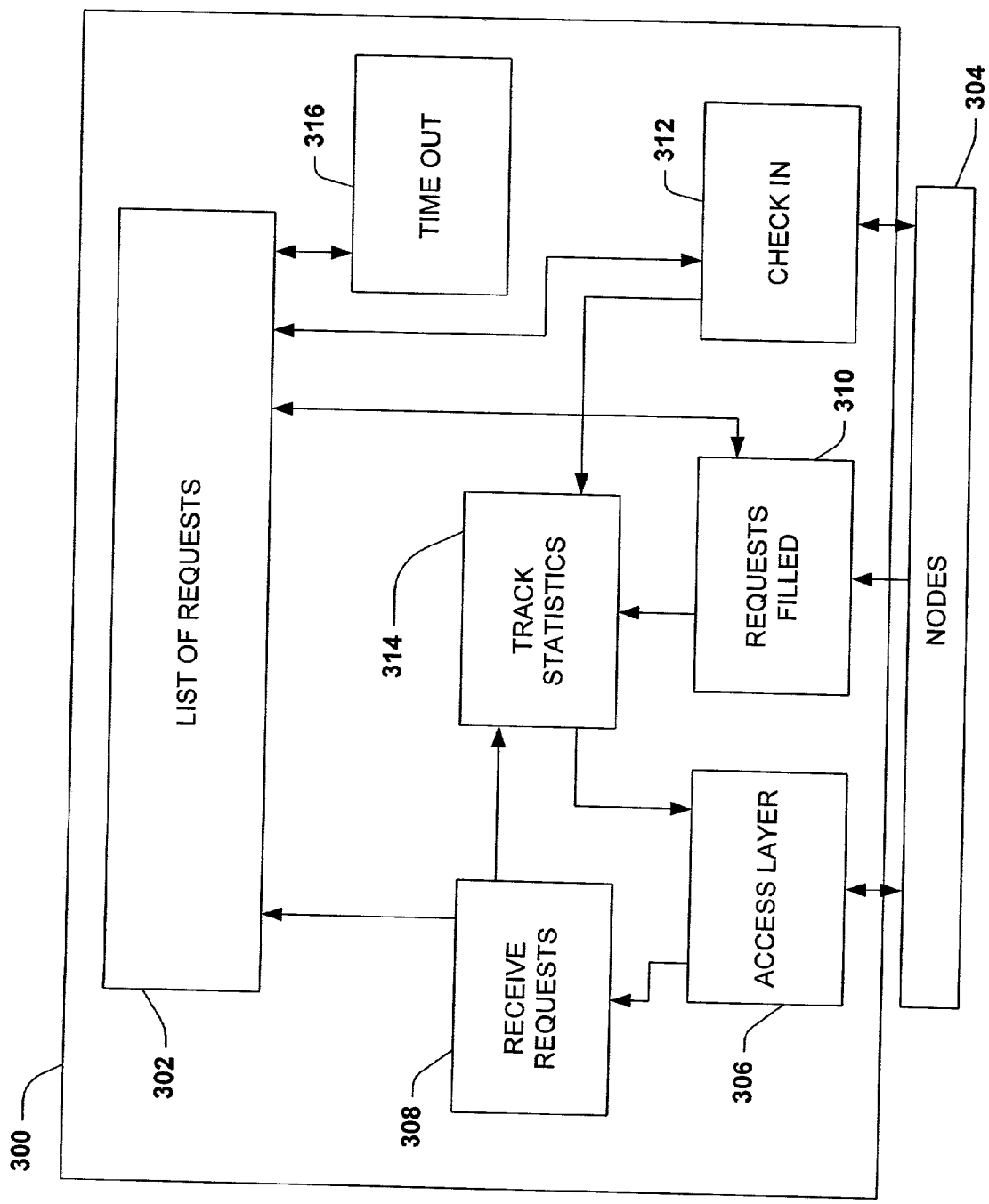
FIG. 3 is a block diagram illustrating a bulletin board according to an aspect of the present invention.

FIG. 3 is a block diagram illustrating a bulletin board 300 according to an aspect of the invention. The bulletin board 300 maintains a list of requests 302 made and filled by nodes 304. The bulletin board 300 includes the list of requests 302, an access layer 306, a receive requests component 308, a requests filled component 310, a check in component 312, a track statistics component 314 and a time out component 316.

The access layer 306 is operative to receive requests for data from the nodes 304. On receiving a request, the access layer 306 determines whether the node making the request should be permitted to have the request added to the list of requests by employing performance statistics for the requesting node from the track statistics component 314. If the requesting node is permitted to make the request, the request is posted to the receive requests component 308. If the requesting node is not permitted to make the request, the request is blocked and the requesting node can be notified that its request has been blocked. Additionally, the access layer 306 is operative to assign and/or modify the check in frequency for the nodes 304 based on their performance statistics. Generally, nodes that have favorable performance statistics (e.g., fill a relatively large number of requests and check in properly) can have their check in frequency reduced so that they are required to check in less often. Additionally, nodes that have unfavorable performance statistics (e.g., only make requests and fail to check in properly) can have their check in frequency increased therein requiring them to check in more often.

The receive requests component 308 is operative to receive requests from the access layer 306, to post or add requests to the list of requests and to report the requests, including the requesting node for respective requests, to the track statistics component 314. As stated above, the receive requests component 308 only receives requests for data made by the nodes 304 that are not blocked by the access layer 306. The requests filled component 310 is operative to receive reports from requesting nodes of the nodes 304 that their request(s) have been filled. The reports additionally include the identification of the node that filled the request. The requests filled component 310 typically verifies reports that requests have been filled to prevent erroneous reports from being accepted thus mitigating nodes from being improperly credited. If a report is valid (e.g., verified), the information is reported to the track statistics component 314. If a report can not be verified, the information is blocked and is not reported to the track statistics component.

The check in component 312 facilitates operation of the board 300 by requiring the nodes 304 to periodically check in according to a required and/or assigned check in frequency. When a node checks in or reports, the check in component 312 transfers a copy of the current list of requests to the node checking in. The check in component 312 then reports the check in by the node to the track statistics component 314. The check in component can also report other information such as, but not limited to, time of check in, assigned time of check in, time since last check in and the like.

The track statistics component 314 is operative to receive information and/or receives various parameters related to the behavior or performance of the nodes 304. The information is generally received from the receive requests component 308, the requests filled component 310 and the check in component 312. Based on that information, including requests made, requests filled, check in frequency and the like, the track statistics component 314 dynamically generates performance statistics for respective nodes of the nodes 304. The performance statistics are typically updated for a particular node when additional information is received for a particular node (e.g., a request is made or a request is filled). The track statistics component 314 stores and maintains the performance statistics and can provide them to the access layer 306 on demand. A separate storage component (e.g., memory, hard drive and the like) can be utilized to store the performance statistics.

The track statistics component 314 is able to generate or compute a number of performance statistics for the respective nodes. One performance statistic that the track statistics component 314 can compute is a ratio of requests filled to requests made for respective nodes. The access layer can determine whether a requesting node exceeds a threshold ratio value in order to enforce fairness. Another performance statistic that the track statistics component 314 can compute is an actual check in frequency for respective nodes. The actual check in frequency is the number of times a particular node has checked in over a set period of time. The actual frequency can be employed by the access layer 306 so as to block requests for nodes that fail to meet a threshold value for their actual check in frequency.

The time out component 316 is operative to remove requests having a low likelihood of being filled from the list of requests 302. Requested data can be so rare or in such low supply that other nodes do not have the requested data and are therefore prevented from transferring the requested data to the requesting node. Instead of maintaining these requests indefinitely, a time out period is selected such that requests are removed or retired that have little or no likelihood of being filled. Additionally, requesting nodes are not required to log off or un-join from the board 300. Thus, a requesting node can unjoin from the board 300 thus preventing requests by that node to be un-fillable. Some typical values for time out periods are 1 day, 2 hours, 45 minutes and the like.

It is appreciated that variations in the components and numbers of the components comprising the board 300 are possible and are still in accordance with the present invention. For example, additional components can be employed to categorize requests into different categories such as media types. Additionally, components can be utilized to provide and/or display information such as popularity of requested data, number or amount of requested data transferred and the like.

Figure 4:
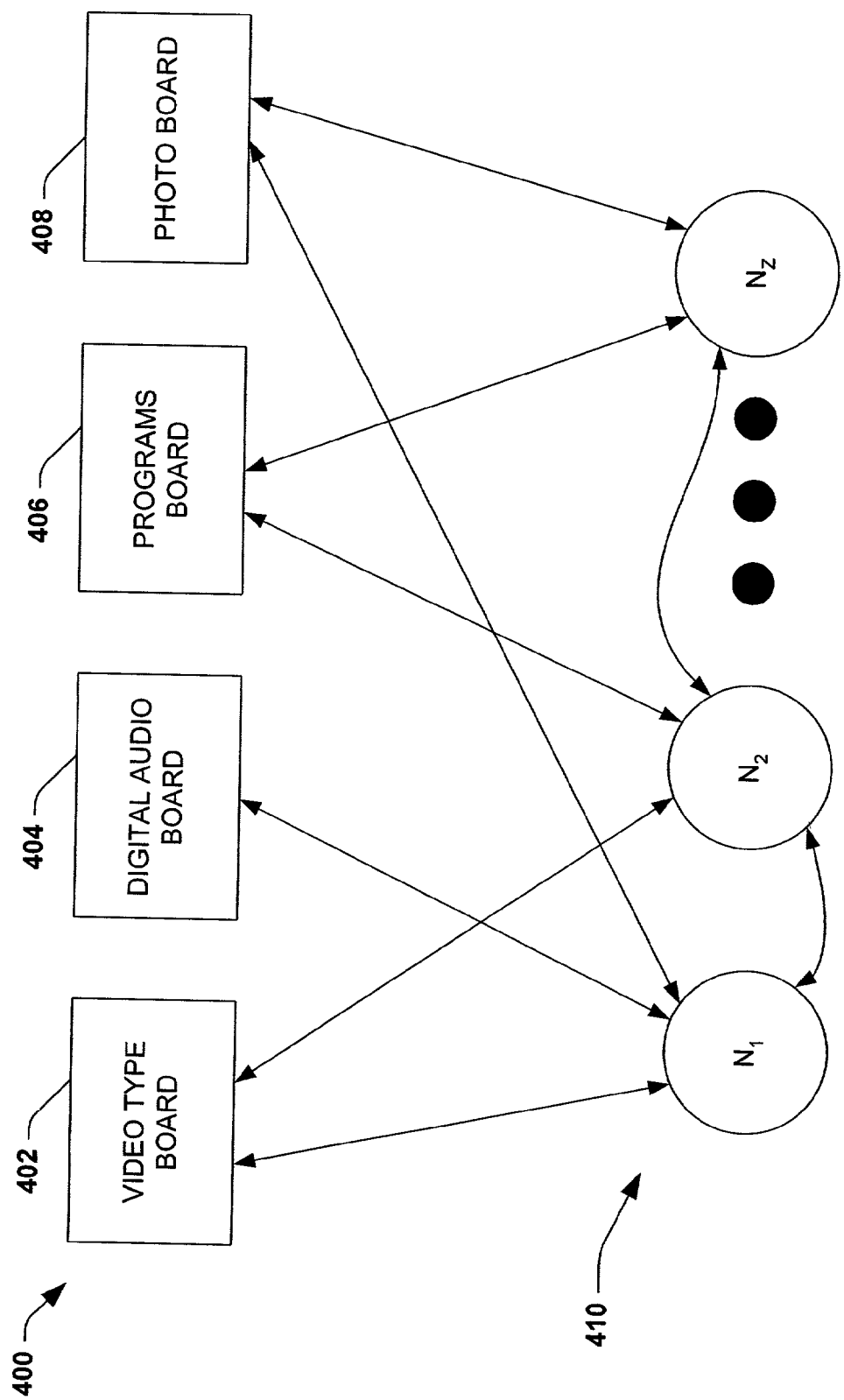
FIG. 4 is a block diagram of a peer to peer network according to an aspect of the present invention.

FIG. 4 is a block diagram of a system 400 of a peer to peer network according to an aspect of the present invention. The system 400 includes a plurality of nodes 410, a video type board 402, a digital audio board 404, a programs board 406 and a photo board 408. The plurality of nodes 410 are operative to make requests for data, to fill requests and to transfer requested data from a sending node to a requesting node.

The video type board 402 maintains and controls a list of requests for video data. The requests in the list comprise indicia of the video data requested (e.g., a video file, video item) and a pointer to a requesting node (e.g., the node of the plurality of nodes 410 making the request). The pointer to the requesting node can comprise a network address or identification (e.g., an IP address and port number) of the requesting node. Additionally, the requests can include other information, such as, priority, desired time out value and the like. The video type board 402 can assign weightings to respective requests of the list based on factors such as popularity (e.g., number of requests for a particular file), length or size of the requested data, scarcity of the data and the like. Thus, for example, a node filling a request for a highly weighted file receives more credit than a node filling a request for a lowly weighted file. Consequently, the plurality of nodes 410 are incentivized to fulfill more heavily weighted requests.

The video type board 402 also receives requests for video data from the plurality of nodes 410. The requests are checked or verified as to whether or not they are for video data. One approach to verify the requests is to determine a file type of the requested data, such as by checking a file extension. For example, video files generally have file extensions of ".avi", "mpg", ".mpeg", ".mov" and the like. The video type board 402 can then block requests on determining that respective requests are not for video type data. Additionally, the video type board 402 tracks performance statistics for the nodes 410 and can determine when to block requests by nodes that are not contributing enough (e.g., by filling requests, checking in appropriately).

The digital audio board 404 maintains and controls a list of requests for audio data. The requests in the list comprise indicia of the audio data requested (e.g., an audio file) and a pointer to a requesting node (e.g., the node of the plurality of nodes 410 making the request). The pointer to the requesting node can comprise a network address or identification (e.g., a IP address and port number) of the requesting node. Additionally, the requests can include other information, such as, priority, desired time out value and the like. The digital audio board 404 can, as described with respect to the video type board 402, assign weightings to respective requests of the list based on factors such as popularity (e.g., number of requests for a particular file), length or size of the requested data, the scarcity of the data and the like. Consequently, the plurality of nodes 410 are encouraged to fill the more heavily weighted requests.

The digital audio board 404 also receives requests for audio data from the plurality of nodes 410. The requests are checked or verified as to whether or not they are for audio data. One approach to verify the requests is to determine a file type of the requested data, such as by checking a file extension. For example, audio files generally have file extensions of ".mp3", ".wma", ".aud" and the like. The digital audio board 404 can then block requests on determining that respective requests are not for audio type data. Additionally, the digital audio board 404 tracks performance statistics for the nodes 410 and can determine when to block requests by nodes that are not contributing enough (e.g., by filling requests, checking in appropriately).

The programs board 406 maintains and controls a list of requests for program data. The requests in the list comprise indicia of the program data requested (e.g., a program or application file(s)) and a pointer to a requesting node (e.g., the node of the plurality of nodes 410 making the request). The pointer to the requesting node can comprise a network address or identification (e.g., an IP address and port number) of the requesting node. Additionally, the requests can include other information, such as, priority, desired time out value and the like. The programs board 406 can, as described with respect to the video type board 402, assign weightings to respective requests of the list based on factors such as popularity (e.g., number of requests for a particular file), length or size of the requested data, the scarcity of the data and the like. Consequently, the plurality of nodes 410 are encouraged to serve the more heavily weighted requests.

The programs board 406 receives requests for program data from the plurality of nodes 410. The requests are checked or verified as to whether or not they are for program data. One approach to verify the requests is to determine a file type of the requested data, such as by checking a file extension. For example, program files generally have file extensions of ".exe" or are in archives with extensions of ".zip", ".ace", ".rar", ".cab", ".tar", ".gz" and the like. The programs board 406 can then block requests on determining that respective requests are not for program type data. Additionally, the programs board 406 tracks performance statistics for the nodes 410 and can determine when to block requests by nodes that are not contributing enough (e.g. by filling requests, checking in appropriately).

The photo board 408 maintains and controls a list of requests for photo data. The requests in the list comprise indicia of the photo data requested (e.g., a photo or image file) and a pointer to a requesting node (e.g., the node of the plurality of nodes 410 making the request). The pointer to the requesting node can comprise a network address or identification (e.g., an IP address and port number, hostname, NetBIOS name) of the requesting node. Additionally, the requests can include other information, such as, priority, desired time out value and the like. The photo board 408 can, as described with respect to the video type board 402, assign weightings to respective requests of the list based on factors such as popularity (e.g., number of requests for a particular file), length or size of the requested data, the scarcity of the data and the like. Consequently, the plurality of nodes 410 are encouraged to fill the more heavily weighted requests.

The photo board 408 also receives requests for photo data from the plurality of nodes 410. The requests are checked or verified as to whether or not they are for photo data. One approach to verify the requests is to determine a file type of the requested data, such as by checking a file extension. For example, photo files generally have file extensions of ".gif", ".tiff", ".jpg", ".png" and the like. The photo board 408 can then block requests on determining that respective requests are not for photo type data. Additionally, the photo board 408 tracks performance statistics for the nodes 410 and can determine when to block requests by nodes that are not contributing enough (e.g., by filling requests, checking in appropriately).

It is appreciated that alternate aspects of the invention can include other types of bulletin boards to facilitate transferring other types of data in addition to or instead of the video type board 402, the digital audio board 404, the programs board 406 and the photo board 408. Additionally, boards can be categorized according to other characteristics such as, for example, music type (e.g., rock, dance, hip-hop and the like). By having multiple boards maintaining lists of requests, latency of the system can be improved. Generally, the less the number of nodes joined to a particular bulletin board, the better the latency for the nodes. For example, if a particular node has and seeks audio files, then latency is improved by the particular node being only a member of the digital audio board as opposed to a more general board facilitating transfer of other types of data.

The plurality of nodes 410 are operative to join, un-join, make requests for data, fill or serve requests for data and check in periodically at a check in frequency with the video type board 402, the digital audio board 404, the programs board 406 and the photo board 408, collectively referred to as the boards. The nodes 410 are typically software components or programs operating or executing on a computer system (e.g., home computer system). The nodes 410 are generally able to communicate with each other, the video type board 402, the digital audio board 404, the programs board 406 and the photo board 408 via a network connection (e.g., Internet, wireless network, local area network, wide area network) employing established protocols. A node of the plurality of nodes 410 can join one of the boards by sending a request to join to the appropriate board. Then, the board responds by either informing the node that it has been added or that the board is unable to accept additional nodes (e.g., the board is full). If the node is added, the board starts tracking performance statistics for the node and can provide the node with initial credits. If the board is full, the board can inform or transfer the node to another board or peer to peer network. A node of the plurality of nodes 410 can un-join one of the boards by reporting to the board that the node is retiring from the board. Additionally, it is appreciated that the boards can retire nodes that fail to properly check in or otherwise perform poorly.

As stated above, the nodes 410 can be required to periodically check in with boards of which they are a member of. On checking in, the nodes 410 receive respective lists of requests from the boards. The nodes 410 can agree to satisfy or fill one or more of these requests by a serving node of the nodes 410 by transferring the requested data to the requesting node. On the requested data being transferred to the requesting node, the requesting node reports to the board that the request has been filled and that the sending node filled the request. The board then removes the request from its list of requests and credits the sending node.

Additionally, the plurality of nodes 410 can be joined to none, one or more of the video type board 402, the digital audio board 404, the programs board 406 and the photo board 408. Thus, the respective nodes are not required to join a particular board and the nodes can be members of multiple boards.

Figure 5:
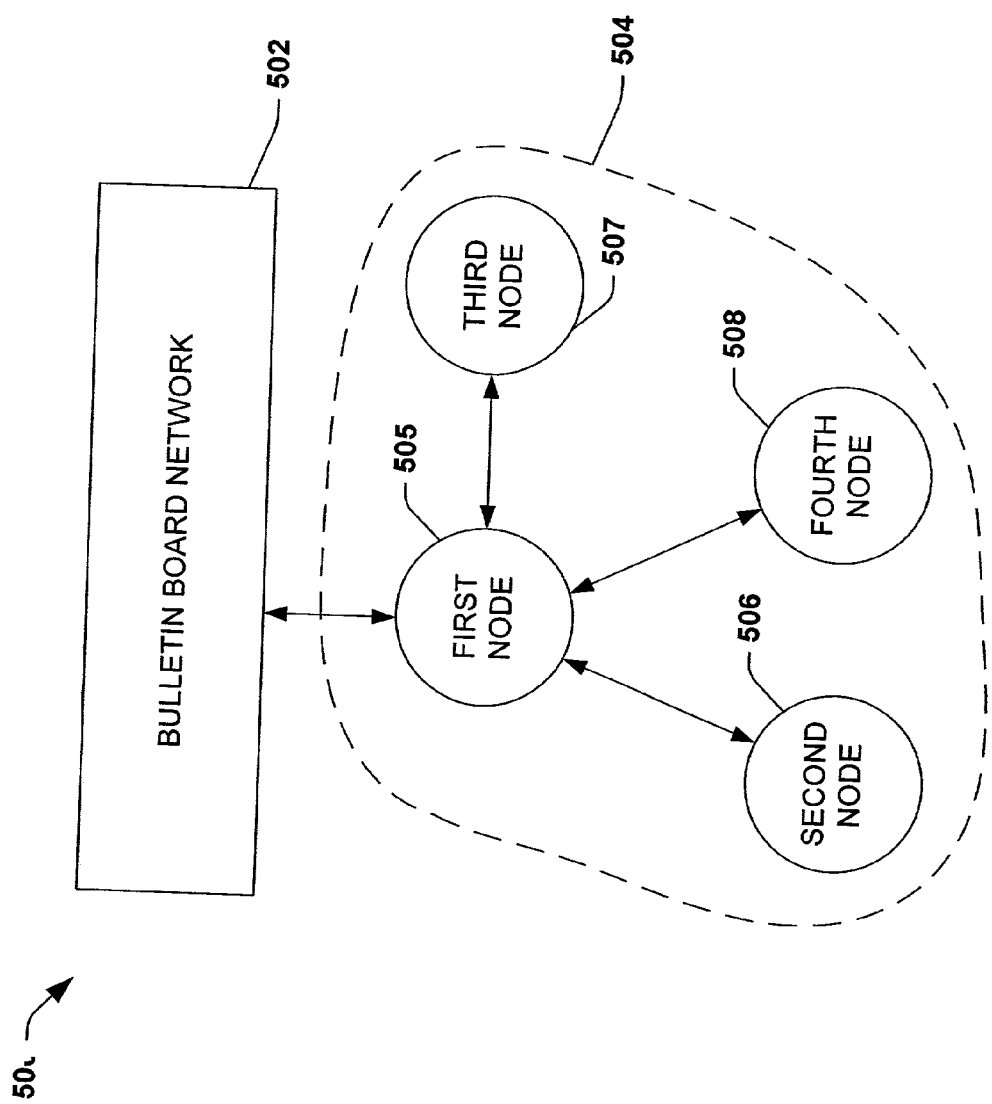
FIG. 5 is a block diagram of a data distribution system according to an aspect of the present invention.

FIG. 5 is a block diagram of a data distribution system 500 according to an aspect of the present invention. The system includes a bulletin board 502 and a plurality of nodes 504 and operates substantially as described in system 200 of FIG. 2. The bulletin board 502 facilitates transferring of data between the plurality of nodes by maintaining a list of requests. The bulletin board 502 is further operative to receive requests, be notified that a request has been filled and to enforce fairness by blocking requests. The group of nodes 504 operate substantially similar to a single node of the plurality of nodes. It is appreciated that some nodes are unable to serve data or transfer data. This can be due to firewalls, security concerns, low outgoing or uploading bandwidth, intranets and the like. However, other nodes can have a large capacity of outgoing bandwidth and therefore be able to serve and/or transfer requested data to other nodes of the plurality of nodes. However, these other nodes can have limited disk space and/or a limited amount of data which they are able to serve and employ to fill requests. Thus, it is desirable for nodes that are unable to serve data to interact with these other node(s) such that they operate effectively as a single node.

The configuration of nodes in the group of nodes 504 is similar to the configuration of an intranet connected to an external network. Thus, the group of nodes 504 includes a first node 505, a second node 506, a third node 507 and a fourth node 508. It is appreciated that other suitable numbers of nodes and other suitable configurations can be utilized for the group of nodes 504 and still be in accordance with the present invention. The first node 505 is operative to communicate with the bulletin board 502 and other nodes of the plurality of nodes. Additionally, the first node 505, the second node 506, the third node 507 and the fourth node 508 are able to communicate and transfer data with each other (e.g., within the group 504).

As describe above, the group of nodes 504 operates as a single node of the plurality of nodes. When the group of nodes is required to check in, the group 504 receives the list of requests maintained by the bulletin board 502. The group 504 determines which requests the respective nodes of the group are able to fill (e.g., have the requested file or data) and determines which, if any, the group 504 will attempt to fill or serve. Then, the requested data is transferred from the group 504, via the first node 505, to a requesting node. As an example, if the third node 507 has the requested data and determines to transfer the requested data to the requesting node, the requested data is transferred to the requesting node via the first node 505. Similarly, a node of the group of nodes can make a request for data (e.g., a file) and the request can be submitted to the bulletin board 502 on behalf of the group 504. For example, the second node 506 can request some particular data and the first node 505 then forwards the request for the some particular data to the bulletin board 502. On another node of the plurality of nodes transferring the some particular data to the group 504 wherein in it is received by the first node 505, the first node 505 transfers the some particular data to the second node 506.

Figure 6:
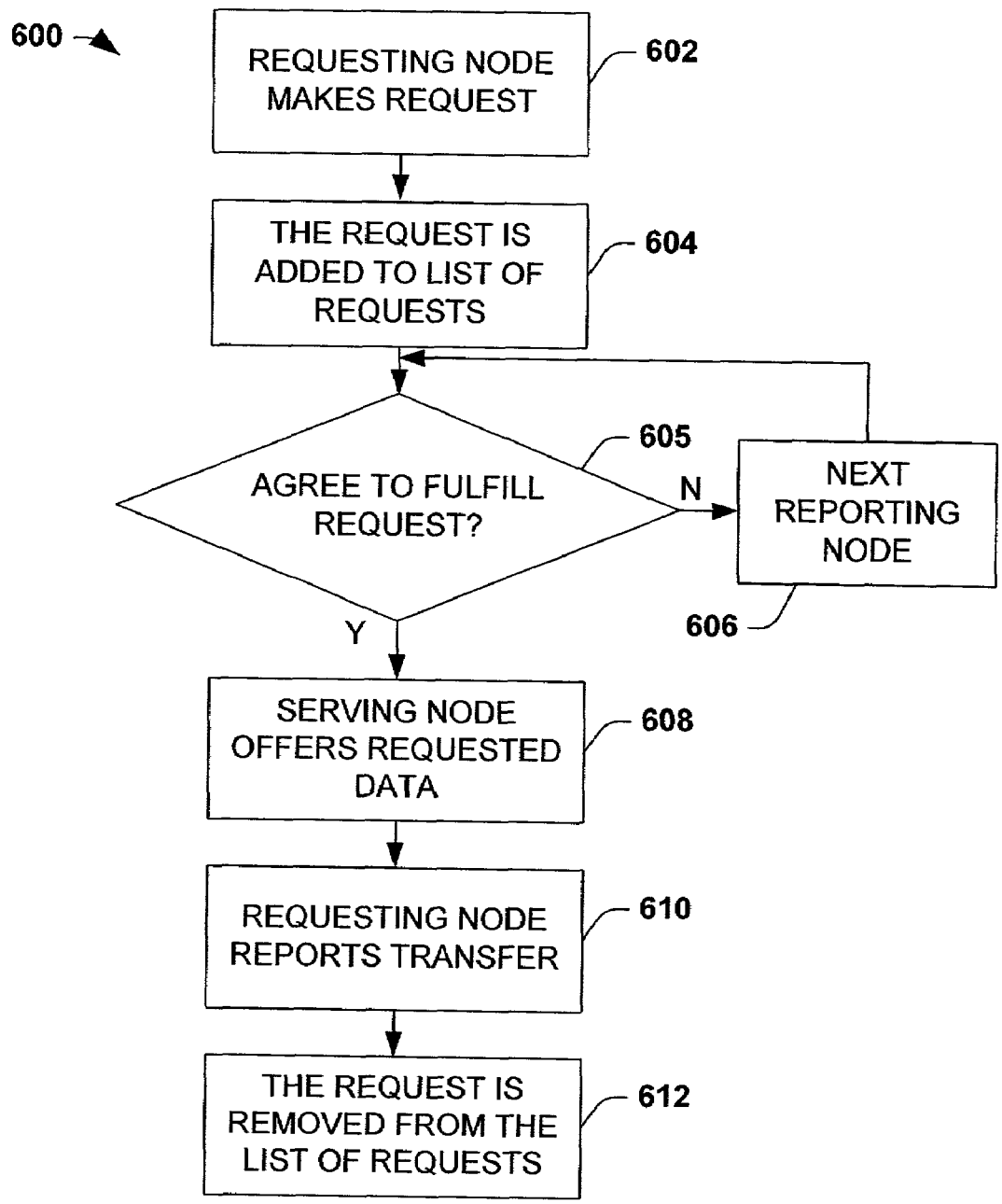
FIG. 6 is a flow diagram of a method of operating a data distribution system according to an aspect of the present invention.
Figure 7:
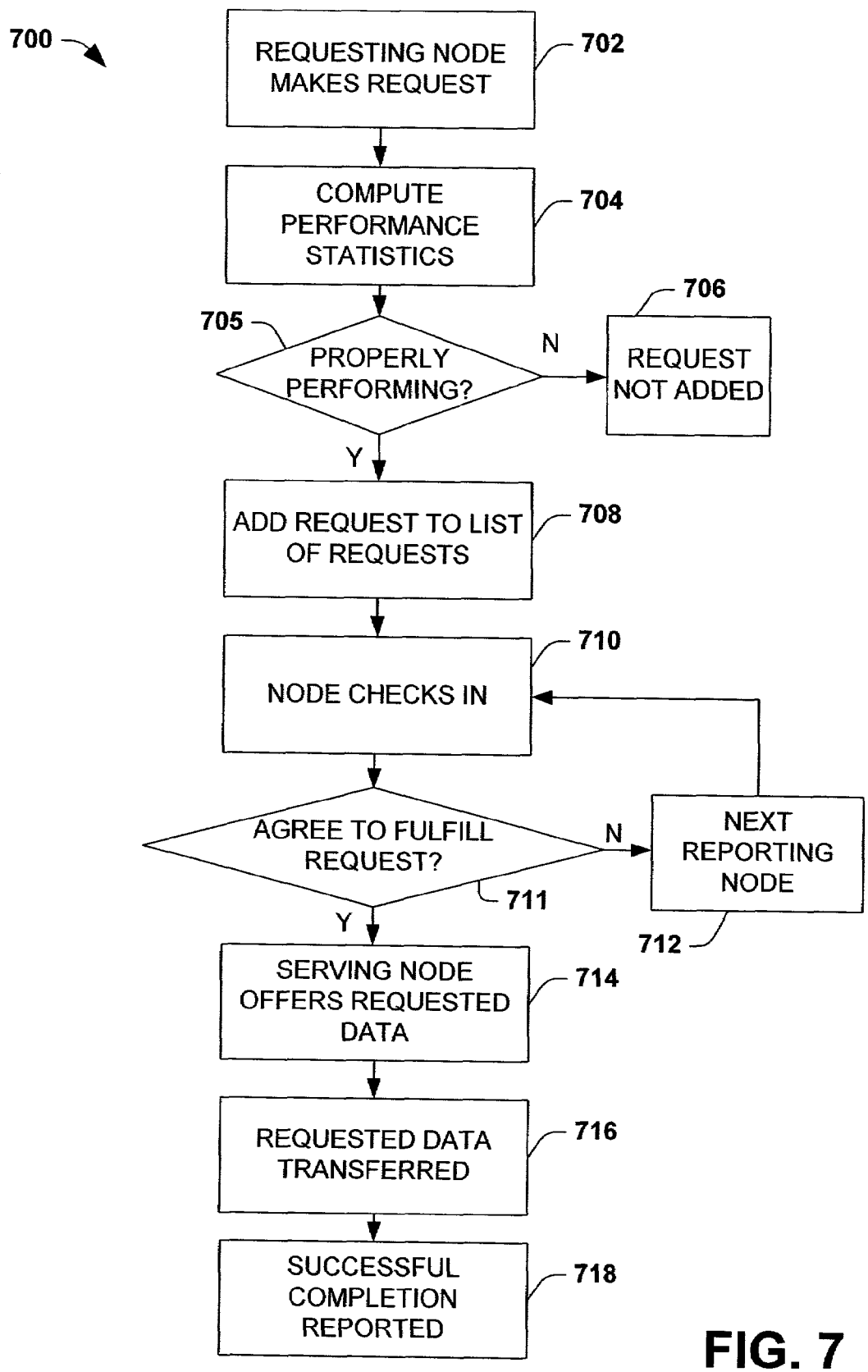
FIG. 7 is a flow diagram of a method of operating a data distribution system according to an aspect of the present invention.
Figure 8:
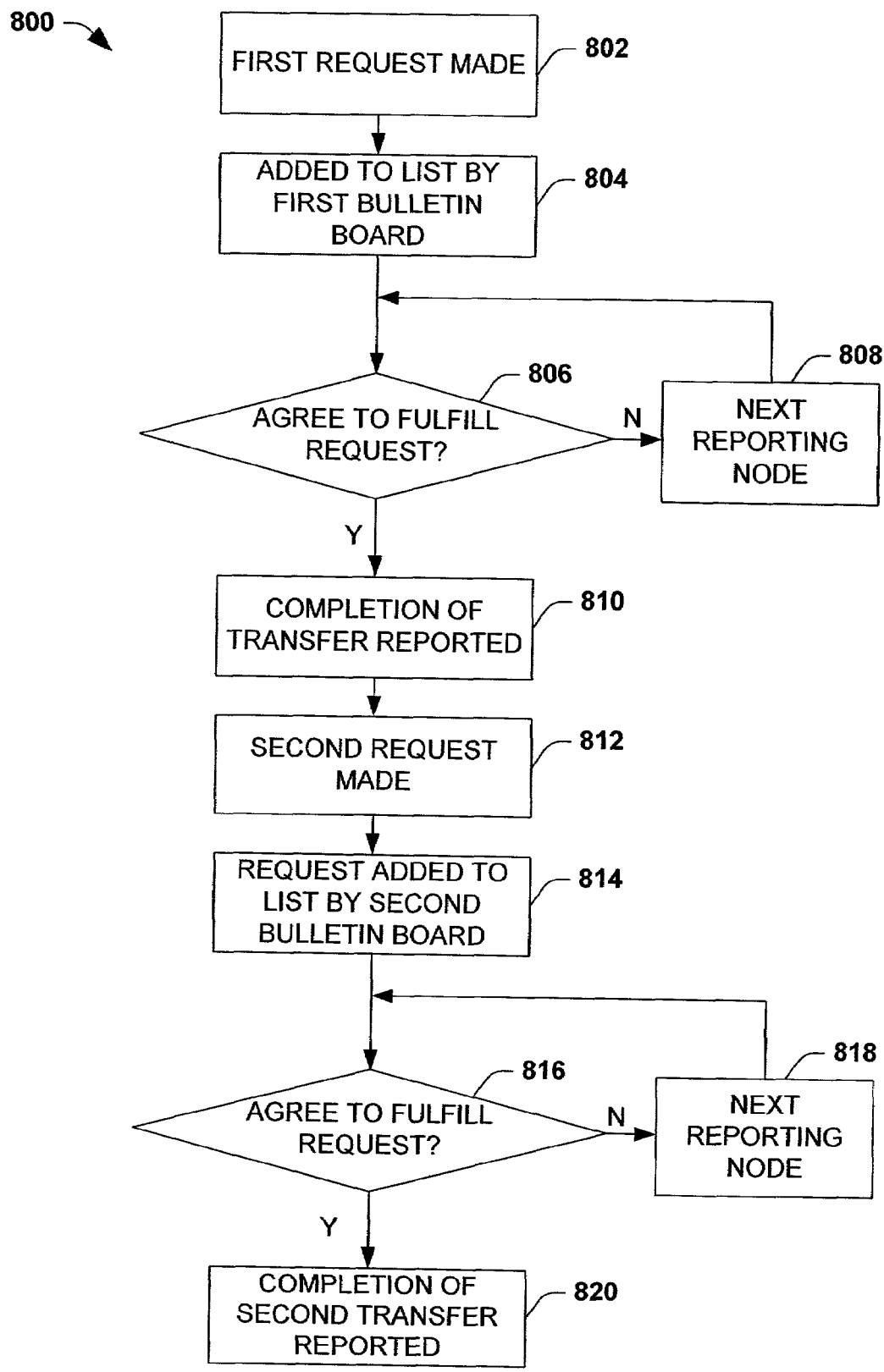
FIG. 8 is a flow diagram of a method of operating a data distribution system according to an aspect of the present invention.

In view of the foregoing structural and functional features described above, methodologies in accordance with various aspects of the present invention will be better appreciated with reference to FIGS. 6-8. While, for purposes of simplicity of explanation, the methodologies of FIGS. 6-8 is depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

FIG. 6 is a flow diagram illustrating a method 600 of operating a data distribution system according to an aspect of the invention. The method 600 facilitates data distribution among nodes of a peer to peer network. A list of requests is maintained at a bulletin board. Requests can be added to the list by respective nodes and requests can be removed from the list by the respective nodes when the requests are filled by another node(s) serving the file to the respective nodes.

A requesting node makes a request for data at 602. The request is made to the bulletin board which maintains the list of requests. A determination can be made that the requesting node has not met a minimum performance threshold and then blocking the request by the requesting node. If blocked, the requesting node can be notified of the blocking and, optionally, information as to why the request was blocked (e.g., failed to check in properly, failed to serve properly and the like). The request is added to the list of requests at 604. Obviously, if the request is blocked, it is not added to the list of requests. The list of requests can be sorted and/or ordered such that older requests are shown first in order to promote a first in, first out structure. The request includes identification or indicia of requested data and a pointer or identification to the requesting node. The request can also include other information such as, priority, bandwidth (e.g., 500 k, 56 k dial up modem, DSL, cable modem and the like), desired time out value and the like.

A node reports in or checks in with the bulletin board and can determine whether to fulfill the request at 605. If the node determines not to fulfill the request, the method 600 continues with a next reporting node at 606. If the node is determined to fulfill the request, the node is referred to as a serving node and the method 600 continues at 608. The determination can be made according to a number of factors including, age of the request, size of the requested data, bandwidth of the requesting node (if known) and the like. The serving node then contacts the requesting node to offer to serve the requested data at 608. The requesting node accepts the offer and the serving node transfers the requested data to the requesting node at 610. The requesting node typically accepts the offer to serve the requested data unless the requested data is no longer desired or has been obtained some other way. It is appreciated that the requesting node can also notify the bulletin board to remove the request from the list of requests in order to mitigate receiving offers to provide the requested data. On completion of the transfer of the requested data, the requesting node reports that the serving node has successfully filled the request at 612. The serving node can then be credited with fulfilling the request and the request is then removed from the list of requests.

FIG. 7 is a flow diagram illustrating a method 700 of operating a data distribution system according to an aspect of the invention. The method 700 facilitates data distribution among nodes of a peer to peer network. A list of requests is maintained at a bulletin board. Requests can be added to the list by respective nodes and requests can be removed from the list by the respective nodes when the requests are filled by another node(s) serving the file to the respective nodes.

A requesting node makes a request for data at 702. The request is made to the bulletin board which maintains the list of requests. Performance statistics are computed for the requesting node at 704. The performance statistics include data served versus data received and number of proper check in(s). A determination is made as to whether the requesting node has met a minimum performance threshold at 705 by employing the performance statistics for the requesting node and then blocking the request at 706 if the performance statistics fail to meet the minimum performance threshold. If blocked (e.g., not added), the requesting node can be notified of the blocking and, optionally, information as to why the request was blocked (e.g., failed to check in properly, failed to serve properly and the like). If the requesting node has met a minimum performance threshold (e.g., if not blocked or rejected), the request is added to the list of requests at 708. The list of requests can be sorted and/or ordered such that older requests are shown first in order to promote a first in, first out structure. The request includes requested data and a pointer or identification to the requesting node. The request can also include other information such as, priority, bandwidth (e.g., 500 k, 56 k dial up modem, DSL, cable modem and the like), desired time out value and the like.

A node checks in at an assigned frequency at 710. Upon checking in, the node receives the list of requests and determines whether to agree to fulfill the request from the requesting node at 711. The node can determine whether or not to fulfill the request according to a number of factors including, age of the request, size of the requested data, bandwidth of the requesting node (if known) and the like. If the node decides not to fulfill the request, the method 700 continues with a next reporting node at 712. Upon determining to fulfill the request, the node, now referred to as a serving node, then contacts the requesting node to offer to serve the requested data at 714. The requesting node accepts the offer and the serving node transfers the requested data to the requesting node at 716. The requesting node typically accepts the offer to serve the requested data unless the requested data is no longer desired or has been obtained some other way. It is appreciated that the requesting node can also notify the bulletin board to remove the request from the list of requests in order to mitigate receiving offers to provide the requested data. On completion of the transfer of the requested data, the requesting node reports that the serving node has successfully filled the request at 718. The serving node can then be credited with filling the request therein improving performance statistics for the serving node. Additionally, the assigned frequency can be adjusted for the serving node.

FIG. 8 is a flow diagram illustrating a method 800 of operating a data distribution system according to an aspect of the invention. The method 800 facilitates data distribution among a plurality of nodes of a peer to peer network. A list of requests is maintained at a bulletin board. Requests can be added to the list by respective nodes and requests can be removed from the list by the respective nodes when the requests are filled by another node(s) serving the file to the respective nodes.

A requesting node sends a first request for a first type of data to a first bulletin board at 802. The first bulletin board maintains a list or requests for the first type of data (e.g., video, audio, program and the like). A determination can be made that the requesting node has not met a minimum performance threshold and then blocking the request by the requesting node. If blocked, the requesting node can be notified by the first bulletin board of the blocking and, optionally, information as to why the request was blocked (e.g., failed to check in properly, failed to serve properly and the like). The request is added to the list of requests at 804 maintained by the first bulletin board. The list of requests can be sorted and/or ordered such that older requests are shown first in order to promote a first in, first out structure. The request includes indicia of requested data and a pointer or identification to the requesting node. The request can also include other information such as, priority, bandwidth (e.g., 500 k, 56 k dial up modem, DSL, cable, T1, T3, modem and the like), desired time out value and the like.

A node reports in or checks in with the bulletin board, receives the list of requests and determines whether to fulfill the request at 806. If the node decides not to fulfill the request, the method 800 continues with a next reporting node at 808. If the node decides to fulfill the request, the node is referred to as a first serving node and the method 800 continues at 810. The determination can be made according to a number of factors including, age of the request, size of the requested data, bandwidth of the requesting node (if known) and the like. The first serving node can then contact the requesting node to offer to serve the requested data. The requesting node accepts the offer and the serving node transfers the requested data to the requesting node. On completion of the transfer of the requested data, the requesting node reports to the first bulletin board that the first serving node has successfully filled the request at 810. The first serving node can then be credited for filling the request at the first bulletin board.

The requesting node sends a second request for a second type of data to a second bulletin board at 812. The second type of data is of a different type than the first type of data. As with the first bulletin board, the second bulletin board maintains a list or requests for the second type of data (e.g., video, audio, program and the like). A determination can be made that the requesting node has not met a minimum performance threshold and then blocking the request by the requesting node. If blocked, the requesting node can be notified by the second bulletin board of the blocking and, optionally, information as to why the request was blocked (e.g., failed to check in properly, failed to serve properly and the like). The request is then added to the list of requests at 814 maintained by the second bulletin board. The request includes indicia of requested data and a pointer or identification to the requesting node. The request can also include other information such as described above.

A second node checks in with the second bulletin board and receives the list of requests and determines whether to fulfill the second request from the requesting node at 816. The second node can determine which request it agrees to fill according to the number of factors described above. If the second node decides not to fulfill the request, the method 800 continues with a next reporting node at 818. If the node decides to fulfill the request, the node is referred to as a second serving node and the method 800 continues at 820. The determination can be made according to a number of factors including, age of the request, size of the requested data, bandwidth of the requesting node (if known) and the like. The second serving node can then contact the requesting node to offer to serve the requested data. The requesting node accepts the offer and the serving node transfers the requested data to the requesting node. On completion of the transfer of the requested data, the requesting node reports to the second bulletin board that the second serving node has successfully filled the request at 820. The second serving node can then be credited for filling the request at the second bulletin board.

Figure 9:
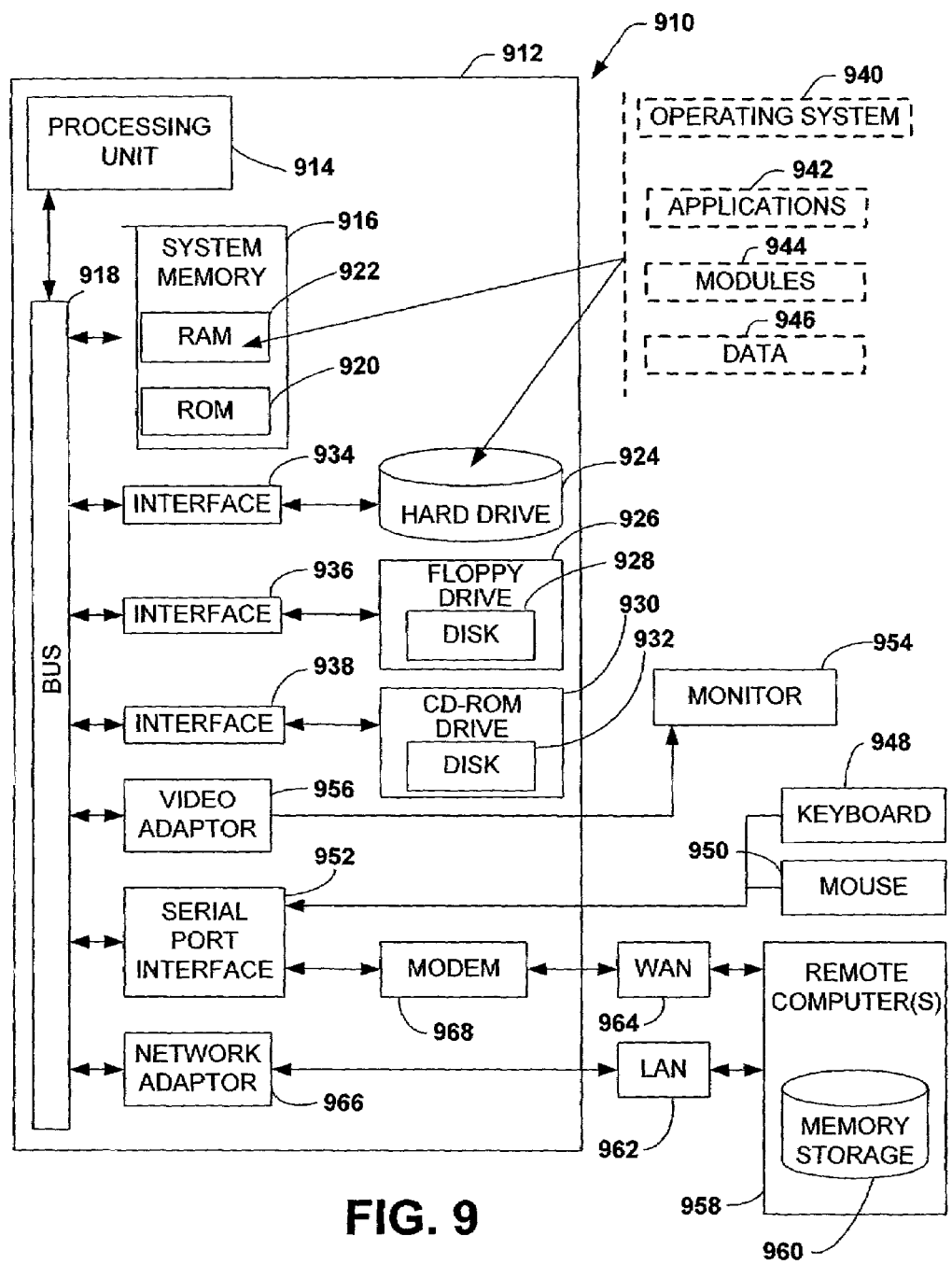
FIG. 9 is a schematic block diagram of an exemplary operating environment for a system configured in accordance with the present invention.

FIG. 9 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 9, an exemplary environment 910 for implementing various aspects of the invention includes a computer 912, including a processing unit 914, a system memory 916, and a system bus 918 that couples various system components including the system memory to the processing unit 914. The processing unit 914 may be any of various commercially available processors. Dual microprocessors and other multi-processor architectures also can be used as the processing unit 914.

The system bus 918 may be any of several types of bus structure including a memory bus or memory controller, a peripheral bus, and a local bus using any of a variety of commercially available bus architectures. The computer memory 916 includes read only memory (ROM) 920 and random access memory (RAM) 922. A basic input/output system (BIOS), containing the basic routines that help to transfer information between elements within the computer 912, such as during start-up, is stored in ROM 920.

The computer 912 may further include a hard disk drive 924, a magnetic disk drive 926, e.g., to read from or write to a removable disk 928, and an optical disk drive 930, e.g., for reading a CD-ROM disk 932 or to read from or write to other optical media. The hard disk drive 924, magnetic disk drive 926, and optical disk drive 930 are connected to the system bus 918 by a hard disk drive interface 934, a magnetic disk drive interface 936, and an optical drive interface 938, respectively. The computer 912 typically includes at least some form of computer readable media. Computer readable media can be any available media that can be accessed by the computer 912. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 912. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 922, including an operating system 940, one or more application programs 942, other program modules 944, and program non-interrupt data 946. The operating system 940 in the computer 912 can be any of a number of commercially available operating systems.

A user may enter commands and information into the computer 912 through a keyboard 948 and a pointing device, such as a mouse 950. Other input devices (not shown) may include a microphone, an IR remote control, a joystick, a game pad, a satellite dish, a scanner, or the like. These and other input devices are often connected to the processing unit 914 through a serial port interface 952 that is coupled to the system bus 918, but may be connected by other interfaces, such as a parallel port, a game port, a universal serial bus ("USB"), an IR interface, etc. A monitor 954, or other type of display device, is also connected to the system bus 918 via an interface, such as a video adapter 956. In addition to the monitor, a computer typically includes other peripheral output devices (not shown), such as speakers, printers etc.

The computer 912 may operate in a networked environment using logical and/or physical connections to one or more remote computers, such as a remote computer(s) 958. The remote computer(s) 958 may be a workstation, a server computer, a router, a personal computer, microprocessor based entertainment appliance, a peer device or other common network node, and typically includes many or all of the elements described relative to the computer 912, although, for purposes of brevity, only a memory storage device 960 is illustrated. The logical connections depicted include a local area network (LAN) 962 and a wide area network (WAN) 964. Such networking environments are commonplace in offices, enterprise-wide computer networks, intranets and the Internet.

When used in a LAN networking environment, the computer 912 is connected to the local network 962 through a network interface or adapter 3366. When used in a WAN networking environment, the computer 912 typically includes a modem 968, or is connected to a communications server on the LAN, or has other means for establishing communications over the WAN 964, such as the Internet. The modem 968, which may be internal or external, is connected to the system bus 918 via the serial port interface 952. In a networked environment, program modules depicted relative to the computer 912, or portions thereof, may be stored in the remote memory storage device 960. It will be appreciated that the network connections shown are exemplary and other means of establishing a communications link between the computers may be used.

Figure 10:
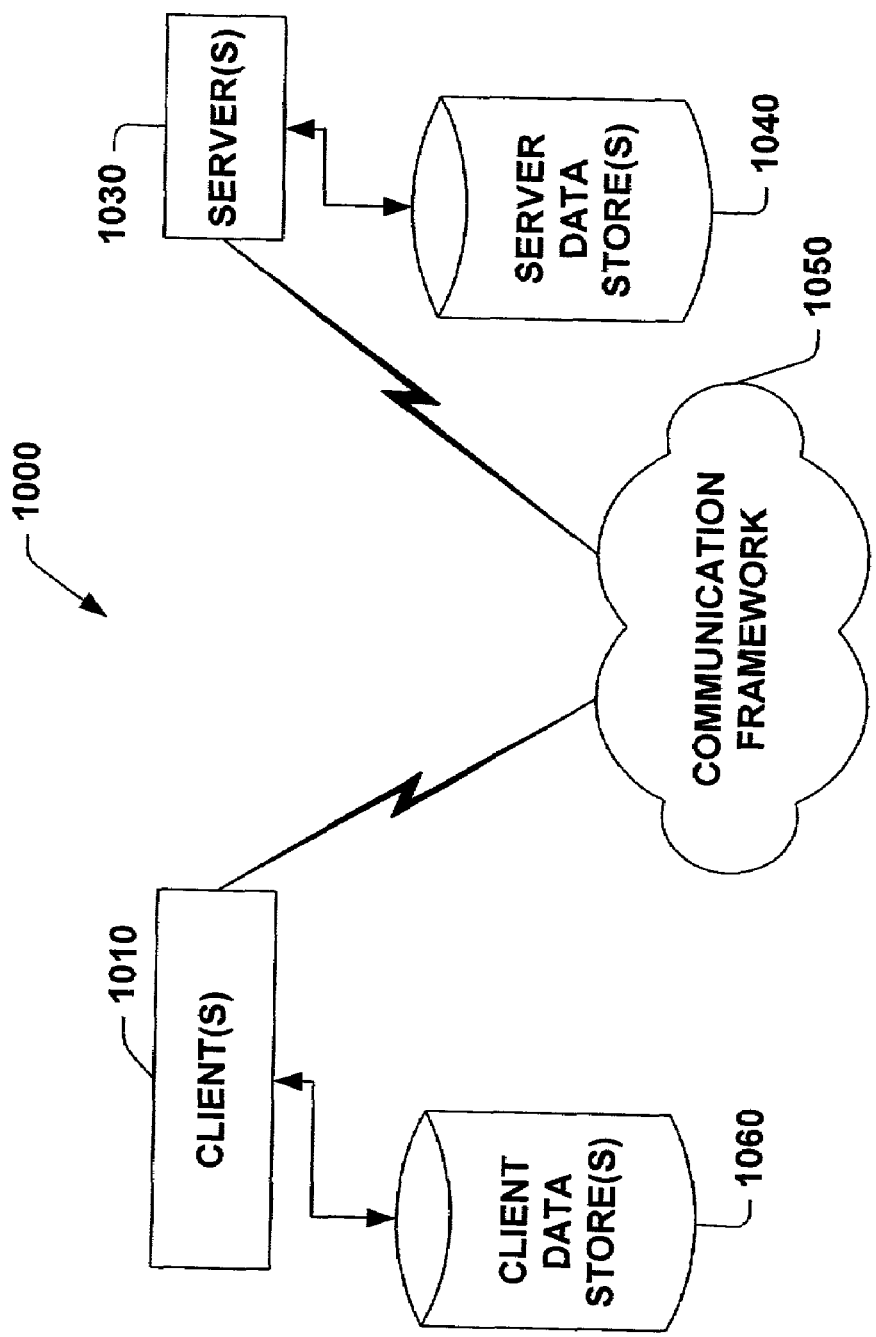
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data distribution system comprising:
    a bulletin board that receives requests, the bulletin board comprising:
        a list storing received requests, the requests being in a predefined machine readable format and respectively aged, the aging of requests is a function of demand of an item associated with respective requests; and
        an access layer that regulates access by a plurality of nodes to the list.

2. The system of claim 1, the access layer providing a node access to the list, the node satisfying a request in the list.

3. The system of claim 2, the access layer tracking performance statistics for a plurality of nodes and regulating requests by the plurality of nodes based on the performance statistics.

4. The system of claim 3, the plurality of nodes required to register with the bulletin board at an assigned check in frequency.

5. The system of claim 4, the performance statistics comprising proper check ins, requests filled and requests made.

6. The system of claim 3, further comprising a host computer that controls the bulletin board and the access layer.

7. The system of claim 1, at least one of the requests comprising identifying indicia relating to an item being requested and a pointer toward a node posting the request.

8. The system of claim 7, the request further comprising priority, desired time out and available bandwidth.

9. The system of claim 7, the pointer comprising an IP address and port number.

10. The system of claim 3, at least a subset of the nodes working in unison to satisfy a particular request, each of the nodes of the subset fulfilling a portion of the request.

11. The system of claim 1, the request being removed from the list upon an age thereof exceeding a threshold value.

12. The system of claim 3, a plurality of computer-based entities accepting in concert as a single node.

13. The system of claim 1, the request being for at least one of: music, video, image, electronic media and software.

14. A data distribution system comprising:
    a plurality of bulletins boards, the plurality comprising:
        a first bulletin board that maintains a list of requests for a first data type; and
        a second bulletin board that maintains a list of requests for a second data type, the list of requests for the first and second data types are sorted.

15. The system of claim 14, the first data type being software.

16. The system of claim 15, the second data type being audio or video type of data.

17. The system of claim 14, the plurality of bulletin boards being viewable concurrently.

18. The system of claim 14, the plurality of bulletin boards being part of a distributed computing system.

19. A method of operating a data distribution system comprising:
    receiving a request for an item from a node;
    adding the request to a list of requests stored on a bulletin board;
    providing access to the list of requests to a serving node; and
    sorting the list of requests.

20. The method of claim 19, further comprising determining that the requesting node has not met a performance threshold and blocking the request.

21. The method of claim 19, the request including a pointer to the requesting node.

22. The method of claim 19, further comprising determining which requests of the list of requests to fill by the serving node prior to agreeing to fUlfilling the request.

23. The method of claim 22, determining which request of the list of request to fill comprises considering factors associated with the request.

24. The method of claim 23, the factors including age, size of the requested data and available bandwidth.

25. The method of claim 19, further comprising contacting the requesting node by the serving node to offer the requested data.

26. The method of claim 25, further comprising accepting the offer by the requesting node prior to transferring the requested data.

27. The method of claim 19, further comprising reporting that the serving node has filled the request by the requesting node.

28. The method of claim 19, further comprising maintaining the list of requests by the bulletin board.

29. A computer readable medium storing computer executable instructions of components operable to perform a method of operating a data distribution system, comprising the following computer executable acts:
 a component for receiving a request for data by a requesting node;
 a component for adding the request to a list of requests stored on a bulletin board;
 a component for maintaining the list of requests;
 a component for regulating access to the list; and
 a component for sorting the list of requests.

30. A computer readable medium having stored thereon a data structure comprising:
 a first data field including information relating a list of requests for item stored on a bulletin board, the list of requests is sorted.

31. A data distribution system comprising:
 means for receiving requests for items;
 means for storing the requests on a bulletin board;
 means for selectively exposing the list to a subset of a plurality of nodes; and
 means for weighting the requests.

32. The system of claim 31, the weighting being a function of supply and demand for an item.

33. The system of claim 31, further comprising means for regulating an amount of requests posted on the bulletin board.

* * * * *

UNITED STATES PATENT AND TRADEMARK OFFICE
CERTIFICATE OF CORRECTION

PATENT NO. : 7,343,418 B2  
APPLICATION NO. : 10/161428  
DATED : March 11, 2008  
INVENTOR(S) : Cormac E. Herley Page 1 of 1

It is certified that error appears in the above-identified patent and that said Letters Patent is hereby corrected as shown below:

In column 18, line 59, in Claim 22, delete "fUlfilling" and insert --fulfilling--, therefor.

Signed and Sealed this

Twenty-second Day of February, 2011

David J. Kappos  
*Director of the United States Patent and Trademark Office*